(12) United States Patent
Wilf

(10) Patent No.: US 9,223,848 B2
(45) Date of Patent: Dec. 29, 2015

(54) SYSTEM AND METHOD OF COMBINED DATABASE SYSTEM

(71) Applicant: Verint Systems Ltd., Herzliya Pituach (IL)

(72) Inventor: Yuval Wilf, Petach-Tiqwa (IL)

(73) Assignee: VERINT SYSTEMS LTD., Herzelia, Pituach (IL)

(*) Notice: Subject to any disclaimer, the term of this patent is extended or adjusted under 35 U.S.C. 154(b) by 233 days.

(21) Appl. No.: 13/663,384

(22) Filed: Oct. 29, 2012

(65) Prior Publication Data

US 2013/0110764 A1    May 2, 2013

(30) Foreign Application Priority Data

Oct. 31, 2011   (IL) .......................................... 216056

(51) Int. Cl.
*G06F 17/30* (2006.01)
(52) U.S. Cl.
CPC .................. *G06F 17/30592* (2013.01)
(58) Field of Classification Search
CPC ..................... G06F 17/30592; G06F 17/30563
USPC .......................................................... 707/600
See application file for complete search history.

(56) References Cited

U.S. PATENT DOCUMENTS

| | | | |
|---|---|---|---|
| 5,689,442 A | 11/1997 | Swanson et al. | |
| 6,404,857 B1 | 6/2002 | Blair et al. | |
| 6,718,023 B1 | 4/2004 | Zolotov | |
| 6,757,361 B2 | 6/2004 | Blair et al. | |
| 7,216,162 B2 | 5/2007 | Amit et al. | |
| 7,464,077 B1* | 12/2008 | Baunach et al. ........ | 1/1 |
| 7,466,816 B2 | 12/2008 | Blair | |
| RE40,634 E | 2/2009 | Blair et al. | |
| 7,587,041 B2 | 9/2009 | Blair | |
| 7,882,087 B2 | 2/2011 | Johnson | |
| 7,908,242 B1* | 3/2011 | Achanta ............... | 707/602 |
| 2005/0015377 A1 | 1/2005 | Wan | |

(Continued)

FOREIGN PATENT DOCUMENTS

WO    03038596 A1    5/2003

OTHER PUBLICATIONS

Cao, Yu, et al., "ES 2: A cloud data storage system for supporting both OLTP and OLAP," Data Engineering, IEEE 27th International Conference, Apr. 11, 2011, pp. 291-302.

(Continued)

*Primary Examiner* — Apu Mofiz
*Assistant Examiner* — Jared Bibbee
(74) *Attorney, Agent, or Firm* — Meunier Carlin & Curfman

(57) ABSTRACT

A system, including both an OLTP database and a warehouse database, that is configured to manage the coordination between the OLTP database and the warehouse database. An aspect relates to a combined OLTP and warehouse database which manages duplicate copies, in both the OLTP database and the warehouse database, of data expected to have a relatively high update and query rate. Data which has a low update and query rate is removed from the OLTP database, such that it remains only in the warehouse database. Updates of the duplicate copy data are performed in the OLTP. Periodically, for example every several minutes, data recently changed in the OLTP database is copied to the warehouse database. Queries are optionally primarily handled by the warehouse database, and are supplemented, when necessary, by data from the OLTP database.

6 Claims, 1 Drawing Sheet

(56) References Cited

U.S. PATENT DOCUMENTS

| | | | |
|---|---|---|---|
| 2005/0065944 A1* | 3/2005 | Gunther et al. | 707/100 |
| 2005/0289129 A1* | 12/2005 | Schmitt | 707/3 |
| 2008/0014873 A1 | 1/2008 | Krayer et al. | |
| 2008/0261192 A1 | 10/2008 | Huang et al. | |
| 2008/0285464 A1 | 11/2008 | Katzir | |
| 2009/0187582 A1 | 7/2009 | Chen et al. | |
| 2009/0319546 A1* | 12/2009 | Shaik | 707/101 |
| 2011/0010330 A1* | 1/2011 | McCline et al. | 707/602 |
| 2011/0138106 A1* | 6/2011 | Prabhakaran et al. | 711/103 |
| 2013/0185349 A1* | 7/2013 | Broda | 709/203 |

OTHER PUBLICATIONS

European Search Report, dated Jun. 5, 2013, received in connection with corresponding European Application No. 12190630.9.

Liu, Rong-Tai, et al., "A Fast Pattern-Match Engine for Network Processor-based NIDS," Proceedings of the 20th International Conference on Information Technology (ITCC'04), Dec. 5, 2006, 23 pages.

Rohde & Schwarz GmbH & Co. KG, "ACCESSNET-T, DMX-500 R2, Digital Mobile eXchange," Product Brochure, Secure Communications, Mar. 2000, 4 pages.

Rohde & Schwarz GmbH & Co. KG, "Accessnet-T IP," Product Brochure, Secure Communications, Jan. 2000, 4 pages.

Rohde & Schwarz GmbH & Co. KG, "R&S AllAudio Integrierte digitale Audio-Software," Product Brochure, Feb. 2002, 12 pages.

Rohde & Schwarz GmbH & Co. KG, "R&S AllAudio Integrated Digital Audio Software," Product Brochure, Radiomonitoring & Radiolocation, Feb. 2000, 12 pages.

Rohde & Schwarz GmbH & Co. KG, "The R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.

Rohde & Schwarz GmbH & Co. KG, "R&S AMMOS GX425 Software," http://www2.rohde-schwarz.com/en/products/radiomonitoringlSignal_AnalysislGX425, Jul. 30, 2010, 1 page.

Rohde & Schwarz GmbH & Co. KG, "R&S RAMON COMINT/CESM Software," Product Brochure, Radiomonitoring & Radiolocation, Jan. 2000, 22 pages.

Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.

Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.

Rohde & Schwarz GmbH & Co. KG, "R&S RA-CM Continuous Monitoring Software," Product Brochure, Radiomonitoring & Radiolocation, Jan. 2001, 16 pages.

Rohde & Schwarz GmbH & Co. KG, "Integrated Digital Audio Software R&S AllAudio," Specifications, 8 pages.

Metronome SSL Inspector Solution Overview White Paper, "Examining SSL-encrypted Communications," 2010, 8 pages.

Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.

Fisk, Mike, et al., "Applying Fast String Matching to Intrusion Detection," Los Alamos National Laboratory and University of California San Diego, 22 pages.

Fox Replay BV, "FoxReplay Analyst," http//www.foxreplay.com, Revision 1.0, Nov. 2007, 5 pages.

Fox-IT BV, "FoxReplay Analyst," Product Brochure, http//www.foxreplay.com, 2 pages.

Aho, Alfred V., et al., "Efficient String Matching: An Aid to Bibliographic Search," Communication of the ACM, Jun. 1975, vol. 18, No. 6, pp. 333-340.

Coffman, T., et al., "Graph-Based Technologies for Intelligence Analysis," CACM, Mar. 2004, 12 pages.

Cloudshield, Inc., "Lawful Intercept Next-Generation Platform," 2009, 6 pages.

Goldfarb, Eithan, "Mass Link Analysis: Conceptual Analysis," 2006, Version 1.1, 21 pages.

Verint Systems Inc., "Mass Link Analysis: Solution Description," Dec. 2008, 16 pages.

High-Performance LI with Deep Packet Inspection on Commodity Hardware, ISS World, Singapore, Jun. 9-11, 2008, Presenter: Klaus Mochalski, CEO, ipoque, 25 pages.

Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.

Schulzrinne, H., et al., "RTP: A Transport Protocol for Real-Time Applications," Standards Track, Jul. 2003, 89 pages.

Sheng, Lei, "A Graph Query Language and Its Query Processing," IEEE, Apr. 1999, pp. 572-581.

Soghoian, Christopher, et al., "Certified Lies: Detecting and Defeating Government Interception Attacks Against SSL," 19 pages.

Svenson, Pontus, "Social network analysis and information fusion for anti-terrorism," CIMI, 2006, 8 pages.

Tongaonkar, Alok S., "Fast Pattern-Matching Techniquest for Packet Filtering," Stony Brook University, May 2004, 44 pages.

Yu, Fang, et al., "Fast and Memory-Efficient Regular Expression Matching for Deep Packet Inspection," ANCS'06, Dec. 3-5, 2006, San Jose, California, 10 pages.

Yu, Fang, et al., "Gigabit Rate Packet Pattern-Matching Usint TCAM," Proceedings of the 12th IEEE International Conference on Network Protocols (ICNP'04) 10 pages.

* cited by examiner

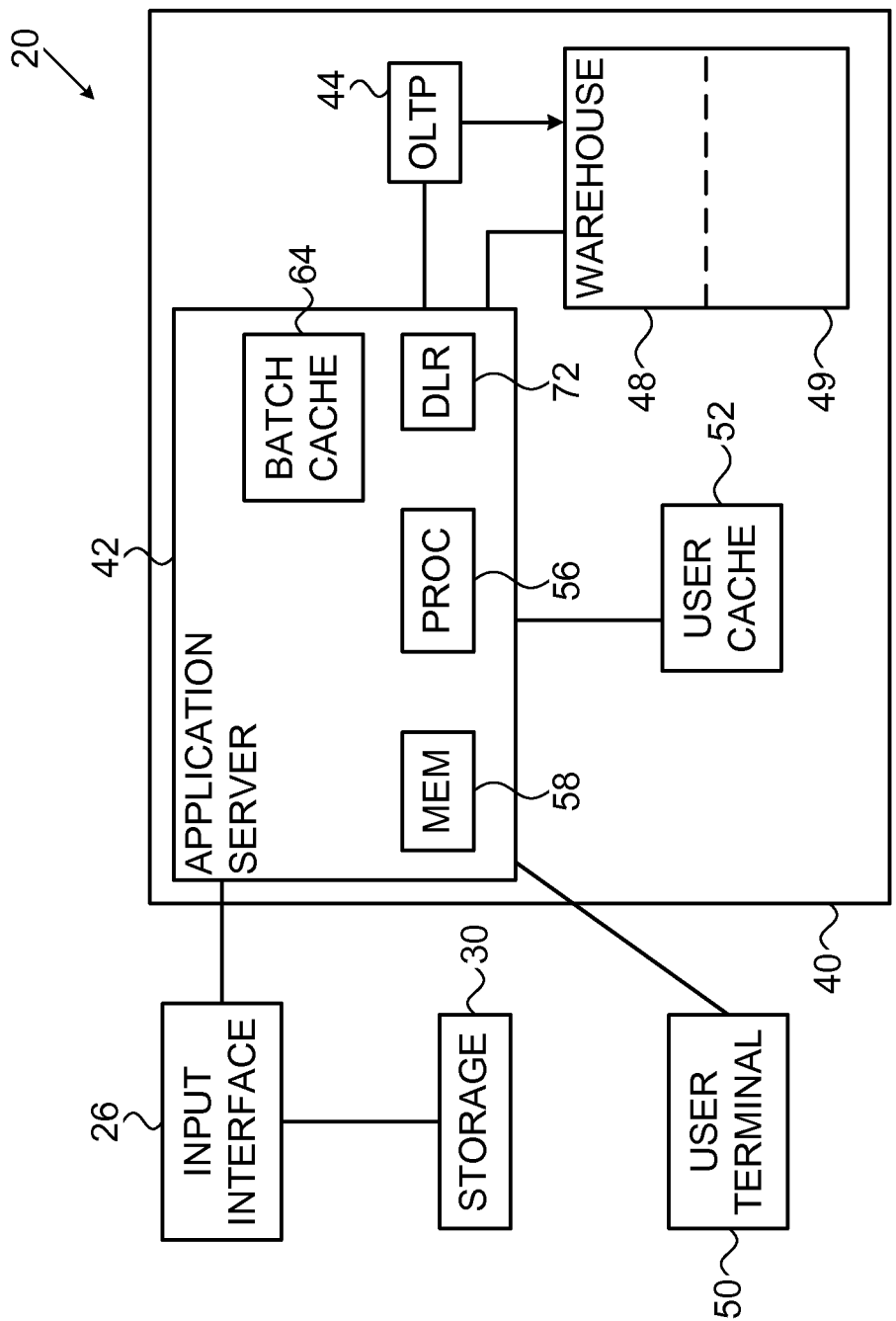

SYSTEM AND METHOD OF COMBINED DATABASE SYSTEM

FIELD OF THE DISCLOSURE

The present disclosure relates generally to databases, and particularly to combined database units.

BACKGROUND OF THE DISCLOSURE

Databases are used for storing large amounts of data. Online Transaction Processing (OLTP) systems are configured for frequent update of records quickly and efficiently, but have limited capacity for performing aggregated and complex queries. In contrast, data warehouses (DWH) are optimized for searching large amounts of information, but are designed for less frequent update.

In order to prevent errors, many databases are locked for access by other users before they are updated and the lock is released only when the update is completed. If a data warehouse requires frequent updates, the locking of the data warehouse may cause substantial interruptions in the service provided by the warehouse.

Accordingly, there have been suggested various systems which combine an OLTP system with a data warehouse.

US patent publication 2005/0289129 to Schmitt describes an OLTP database and OLAP database which are synchronized periodically during the night.

US patent publication 2009/0319546 to Shaik describes methods for transferring data from an OLTP system to a data warehouse.

US patent application publication 2005/0065944 to Gunther et al. describes a system in which data is transferred from an OLTP database to a warehouse database. Timestamps are used to indicate the data which is to be transferred in periodic data warehouse updates.

Other systems for updating databases are also known, as well as methods for avoiding the need for frequent updates.

U.S. Pat. No. 7,882,087 to Johnson describes a method of updating a data storage system. A database includes raw tables and derived tables and a system for updating the derived table with the data of the raw tables.

US patent application publication 2011/0010330 describes managing an append-only table and a separate update table within a data warehouse, so as to avoid the need to update the data warehouse frequently.

US patent application publication 2009/0187582 to Chen et al., describes a method of frequent updating of a large warehouse.

SUMMARY OF THE DISCLOSURE

An embodiment that is described herein provides a method for database management.

There is therefore provided in accordance with an embodiment of the present invention a database system, including an online transaction processing unit (OLTP), a warehouse database, and an application server configured to receive database commands, to store data to be stored in the database system in the warehouse database, and to store a portion of the data in the database system, which is expected to have a relatively high update rate, in the OLTP, in addition to its being stored in the warehouse database.

Optionally, the application server is configured such that the OLTP does not store data which is not stored in the warehouse database, except for data recently added to the database which was not yet copied to the warehouse database. Optionally, the application server is configured to store newly received data in the OLTP.

Optionally, the application server is configured to periodically copy data in the OLTP recently added or updated to the warehouse database. Optionally, the application server is configured to perform the periodic copying of data in the OLTP recently added or updated to the warehouse database, at least once an hour. Optionally, the application server is configured to perform the periodic copying of data in the OLTP recently added or updated to the warehouse database, at least once every fifteen minutes. Optionally, the warehouse database comprises a long term area and a short term area and wherein the portion of the data stored additionally in the OLTP is stored in the short term area of the warehouse database. Optionally, the application server is configured to periodically remove from the OLTP, data which is not expected to have a relatively high update rate any more. Optionally, the data which is not expected to have a relatively high update rate any more comprises data which is stored in the database system for longer than a predetermined period.

Optionally, the application server is configured to periodically remove from the OLTP data which is not expected to have a relatively high update rate any more, once a day.

Optionally, the warehouse database comprises a long term area and a short term area and wherein the portion of the data stored additionally in the OLTP is stored in the short term area of the warehouse database, and wherein in parallel to removing data not expected to have a relatively high update rate any more from the OLTP, the copy of the removed data in the warehouse database is moved from the short term area to the long term area.

There is further provided in accordance with an embodiment of the present invention, a method of managing a database, including providing an online transaction processing unit (OLTP) and a warehouse database, storing newly received data in the OLTP, periodically copying all newly received data from the OLTP to a short term area of the warehouse database, at least once an hour, such that the data in the OLTP is duplicated in the warehouse and periodically moving data expected to have a low update rate from the short term area to a long term area of the warehouse database and removing the moved data from the OLTP.

Optionally, the method includes estimating whether received queries need real time information and accordingly determining whether to forward the queries to the OLTP or to the short term area. Optionally, periodically copying all newly received data from the OLTP to a short term area of the warehouse database comprises copying newly received data within at most 10 minutes. Optionally, data is expected to have a low update rate if it is in the database at least a predetermined period.

The present disclosure will be more fully understood from the following detailed description of the embodiments thereof, taken together with the drawings in which:

BRIEF DESCRIPTION OF THE DRAWINGS

FIG. 1 is a block diagram that schematically illustrates a database system, in accordance with an embodiment of the present disclosure.

DETAILED DESCRIPTION OF EMBODIMENTS

In accordance with some embodiments, a system including both an OLTP database and a warehouse database is described. The system is configured to manage the coordination between the OLTP database and the warehouse database in a manner which on the one hand allows efficient response to queries by the warehouse and on the other hand allows efficient update of the database without too frequent locking of the warehouse database.

An aspect of some embodiments relates to a combined OLTP and warehouse database which manages duplicate copies, in both the OLTP database and the warehouse database, of data expected to have a relatively high update and query rate. Data which has a low update and query rate is removed from the OLTP database, such that it remains only in the warehouse database.

Updates of the duplicate copy data are performed in the OLTP. Periodically, for example every several minutes, data recently changed in the OLTP database is copied to the warehouse database. Queries are optionally primarily handled by the warehouse database, and are supplemented, when necessary, by data from the OLTP database.

In some embodiments, the warehouse database includes two separate areas: a short term area in which duplicate data of the OLTP database is stored and a long term area in which data not stored in the OLTP database is stored. Periodically, for example once a day, the data in the short term area is reviewed to determine what data should be transferred to the long term area and removed from the OLTP database.

Optionally, the duplicated data includes data first entered to the combined database, and the data remains duplicated until a predetermined time passes from the creation of the data. Alternatively or additionally, the duplicated data is data having a relatively high recent update rate.

In some embodiments, data in the combined database may belong to one of three groups:
 1) data kept only in the OLTP database
 2) duplicated data
 3) data kept only in the warehouse.
Optionally, the data kept only in the OLTP is only data which was recently added to the combined database and the database operation has not yet made a copy thereof in the warehouse. Alternatively, the control of the combined database may be configured to keep specific types of data only in the OLTP for relatively long periods of more than two hours, more than a day or even more than a week. Such data may be, for example, data which has a high update rate and low query rate.

System Overview

FIG. 1 is a block diagram that schematically illustrates a database system 20, in accordance with an embodiment of the present disclosure. System 20 includes a database 40 and an input interface 26 through which data is provided to the database system. Database system 20 may be used for a wide variety of data types, particularly data which has periods of high update rates and periods of low update rates. Database system 20 may be used for data of many different fields, including banking, billing, sales, etc. In some embodiments, system 20 is used for metadata of raw data accumulated in a storage unit 30.

A user terminal 50 allows an authorized user to search database 40 and storage unit 30 for information of interest.

Database 40 optionally comprises an application server 42, an OLTP unit 44 and a database warehouse unit 46. Warehouse unit 46 is optionally divided into a short term area 48 and a long term area 49. Short term area 48 optionally serves as a staging area in which records are kept in parallel to OLTP 44 during periods in which the data is expected to have a high update rate and in which indices are prepared.

In some embodiments, a cache 52 stores copies of records recently extracted from warehouse 46, in order to reduce the number of accesses to the warehouse. Optionally, the cache determines which data is to be removed according to a last recently used (LRU) scheme. Alternatively, any other cache management method may be used.

Application server 42 is implemented in hardware, software, firmware or combinations thereof. Application server 42 typically comprises a processor 56, and software for carrying out the functions that are described herein, stored, for example, in a software memory 58. The software may be downloaded to the processor in electronic form, over a network, for example. Alternatively or additionally, the software may be held on tangible, non-transitory storage media, such as optical, magnetic, or electronic memory media.

A data layer router (DLR) 72 of application server 42 optionally receives database commands (e.g., Insert, Delete, Update, Queries), and determines to which unit or units of the database they are to be forwarded, as discussed in detail below. Optionally, application server 42 additionally manages a metadata file library 74 including a metadata file (e.g., a set of one or more XML files) corresponding to each type of database command (e.g., SQL command) and unit or set of units to which the database command is directed.

Application server 42 receives from OLTP 44 and warehouse 46 responses to queries, and processes the results for their return to the originator of the query (e.g., input interface 26, terminal 50), for example by combining results from OLTP 44 and warehouse 46 and/or removing duplicates, when necessary.

Application server 42 is optionally designed in a modular manner, allowing scalability by addition of processors to increase the amount of database commands it can handle.

Optionally, users of system 20 are not required to be aware of the internal structure of database 40.

Create, Update and Delete

New data received from input interface 26, e.g., in a create-command, is written by application server 42 as new records into OLTP unit 44, where the records are relatively easily updated.

When a command to update a record is received by application server 42, the application server optionally determines where the record is located and accordingly sends the update instruction to a unit storing the record. Optionally, if the record is located in OLTP 44, regardless of whether it is also in warehouse 46, the update command is provided to OLTP 44. Updates of records not in OLTP 44 are provided to warehouse 46.

In some embodiments, application server 42 manages a directory indicating where records are located. Alternatively, application server 42 queries OLTP 44 and/or warehouse 46 to determine where records are located. Further alternatively, strict rules determine whether a record is located in OLTP 44 or in long term area 49, for example based on session creation time, and application server 42 determines where the record is stored, from one or more attributes of the session, based on the rules. For example, OLTP 44 may store all records created in the recent X days, while all older records are stored in long term area 49 of warehouse 46. When a database command is received, the date of the data it relates to is determined from an attribute of the command, such as an ID, and accordingly the unit to which the command is forwarded is selected.

Optionally, update commands to long term area 49 are accumulated into a batch performed together in order to reduce the burden on warehouse 46, which may need to lock its entire database in order to perform the instruction. The update commands are optionally accumulated in a batch cache 64 of application server 42. The accumulation optionally collects update commands over at least 1 second, at least 3 seconds or even at least 5 seconds, in order to reduce the amount of time for which warehouse 46 is locked due to updates.

In some embodiments, application server 42 reviews the responses to queries provided by warehouse 46, comparing the results to the contents of batch cache 64. If the query results include data which should have been changed by a command in cache 64, before the query was received, the results are changed by application server 42 to reflect the updated data.

Delete commands are optionally handled in a manner similar to that described for the update commands. In other embodiments, delete commands for records in both OLTP 44 and warehouse 46 are transferred to both units concurrently.

OLTP 44 optionally marks records that were created, changed or deleted and periodically transfers these records to short term area 48 of warehouse 46. Alternatively, create, update and/or delete commands provided to OLTP 44 are stored by application server 42 in batch cache 64 and the accumulated commands are provided to warehouse 46 periodically.

Duplication

Periodically, a copy of records recently added and/or changed in OLTP unit 44 is stored in short term area 48 of warehouse unit 46, such that the information is stored in both OLTP unit 44 and warehouse unit 46. At the same time, in some embodiments, records recently deleted from OLTP 44 are deleted from warehouse 46.

The copying of new and changed information to warehouse 46 is optionally performed relatively frequently, so that results of queries directed to warehouse 46, even if not completely current, are relatively up to date. The copying is performed, for example, less than every 6 hours, less than every 2 hours or even less than every hour, or even less than every 20 minutes. Optionally, however, the data is not copied too frequently in order not to burden OLTP 44 and/or warehouse 46 with too frequent data transfers. Optionally, the frequency of copying new and changed information to warehouse 46 is set based on the longest period between updates which is still considered feasible for queries which do not require real time information. In some embodiments of the invention, the rate of copying new and changed information to warehouse 46 is selected to assure at least a predetermined percentage of queries which can be handled by warehouse 46 without OLTP 44. In one embodiment, the copying is performed about every five minutes.

In some embodiments, the copying is performed at a period longer than the average session length, or even twice the average session length, so that most sessions have been completed when they are copied to warehouse unit 46 and the chances they will be changed are relatively low. Optionally, the period of copying from OLTP unit 44 to warehouse 46 is selected such that at least a predetermined percentage (e.g., 50%, 75%) of the sessions have been completed by the time their record is transferred to warehouse 46. Alternatively or additionally, the period of copying from OLTP unit 44 to warehouse 46 is selected such that at least a predetermined percentage of update and delete commands will be directed to records still stored in OLTP unit 44.

The copying from OLTP 44 to warehouse 46 optionally performed using an ETL (Extract, Transform, Load) process. During the copying of data to short term area 48, warehouse 46 is optionally not locked, as the copying only affects short term area 48, which is only changed in the periodic data copying from OLTP 44. Alternatively, during the copying of records from OLTP 44 to short term area 48, short term area 48 is locked for updates. In other embodiments, during the periodic copying from OLTP 44 to short term area 48, the entire warehouse 46 is locked for updates.

In OLTP 44, queries are optionally handled as usual during the copying of data from OLTP 44 to warehouse 46. In some embodiments, new records are created in OLTP 44 as usual during the copying. Optionally, also updates are performed as usual by OLTP 44 during the copying. Alternatively, updates are accumulated and performed after the copying is completed, to avoid cases in which copied data is updated exactly when it is being copied.

Removal of Duplication

The records collected in short term area 48 are optionally transferred to long term area 49, a predetermined period after they are created. The records are transferred in a transfer process carried out periodically, for example once or twice a day, preferably at a low usage interval of database 40, such as during the night. The transfer may alternatively be performed less frequently, for example every 2 or 3 days and/or at times selected according to the number of records accumulated. The predetermined period for which records are stored in short term area 48 is optionally longer than a week or even longer than two weeks. In one embodiment, the period is about 15 days.

The period after which records are transferred to long term area 49 is optionally selected such that the reception of update commands is rare enough so that the burden on warehouse 46 is not too large. Alternatively or additionally, the period after which records are transferred to long term area 49 is selected such that the urgency of the user to receive information is relaxed, allowing application server 42 to batch together update commands.

After completing the transfer of records from short term area 48 to long term area 49 the records are optionally deleted from OLTP 44. During the deletion, OLTP 44 is optionally locked for updates.

In some embodiments, the transfer from short term area 48 to long term area 49 and the deletion of the corresponding data from OLTP 44 are performed in a single transaction, such that if one of the operations failed, the entire transaction is cancelled and not performed.

The transfer of records from short term area 48 to long term area 49 is optionally performed using an ETL (Extract, Transform, Load) process, without locking the source or destination of the copy/transfer. Alternatively, the entire database 40 is locked during the transfer and delete operation.

Update commands received during the transfer are directed to OLTP 44. If a copying of new and updated records from OLTP 44 to short term area 48 is scheduled to be performed while a transfer from short term area 48 to long term area 49 is in progress, the copying is optionally postponed until the transfer is completed. Alternatively, the transfer is stopped for a short time to allow the copying to be performed and is then resumed.

As a result, OLTP 44 is kept up-to-date providing real time information, while short term area 48 lags behind, generally by several minutes or hours, depending on the application. Thus, the advantages of warehouse 46, such as generation of OLAPs and relatively fast responses to queries relating to large amounts of data, can be enjoyed by most queries, without over burdening warehouse 46 with very often updates.

Queries

Queries directed to database 40 are optionally forwarded to OLTP 44, short term area 48 and/or to long term area 49 according to the data to be accessed, in order to respond to the query. When queries are sent to two or more database units, e.g., both OLTP 44 and long term area 49, application server 42 optionally combines the results and removes duplicates, before providing them to the user. Optionally, when the combining involves a complex operation, such as in some Join commands, the data to be joined is cached internally in application server 42 (e.g., in memory 58), so that the operation can be performed efficiently.

When a query relates to duplicated data, the query is optionally forwarded to short term area 48 which generally can respond more efficiently than OLTP 44 to queries. Optionally, when a query requiring real time information relates to data which is not up-to-date in short term area 48 the query is transferred to OLTP 44 and not to short term area 48.

In some embodiments of the invention, application server 42 determines for received queries, whether they require a real time response or can be satisfied with close to real time information from short term area 48. The determination may be based on user indications and/or on the types of queries received. For example, queries relating to long term reports and/or analysis are optionally considered to be satisfied by the information in warehouse 46, while queries relating to recent information, for example from a recent day or week, are considered as requiring real time information from OLTP 44.

In other embodiments, queries relating to duplicated records are directed according to the type of the query. Simple queries are optionally handled by OLTP 44 which is more up to date, while complex and/or aggregate queries are handled by warehouse 46. The user is required to take into account that responses to complex queries may not be entirely up to date. Alternatively, a supplementary query is submitted to OLTP 44 and application server 46 combines the query results.

In some embodiments of the invention, application server 42 operates synchronously, not picking up a next database command for handling before the handling of a previous database command is complete. In other embodiments, in order to reduce latency, application server 42 operates asynchronously, providing additional database commands to OLTP 44 and/or warehouse 46, before a final response to one or more previous commands was received. Optionally, asynchronous operation is used only for heavy commands Application server 42 optionally estimates for each command the time it will take to handle. If the estimated time is short, the command may be sent to OLTP 44 and/or warehouse 46 in a blocking mode, such that application server 42 will not handle an additional command until a response is received. When the estimated time is relatively long, application server 42 optionally sends the command to OLTP 44 and/or warehouse 46 is a non-blocking mode.

Application server 42 optionally buffers the commands it forwards asynchronously, to allow roll-backing in case a command fails. Particularly, when a command affects both OLTP 44 and warehouse 46, if the command fails in one of the units it is rolled back in the other unit in order to preserve consistency of the database 40. Before handling a current command asynchronously, application server 42 optionally checks that the results of the command will interfere with or be interfered by any of the commands preceding the current command, which were not completed yet. The handling of such interfering commands is optionally deferred until the handling of the previous interfering commands is completed. Alternatively, if the current command is a query, application server 42 may pass the query to the respective unit for handling, and correct the received results for the interfering commands.

Duplicated Data

As discussed above, in some embodiments, the duplicated data comprises records which were recently added to database 40. The record duplication is cancelled a predetermined time after the records were added to database 40.

In other embodiments, one or more other considerations may be used alternatively or additionally in determining the duplicated records. For example, the determination on whether data is to be duplicated may depend on its popularity. Optionally, for some or all of the records in database 40, application server 42, or a different unit, keeps track of the number of queries and/or updates relating to the record directed to the database. Optionally, each time the transfer process is performed, the records are reviewed to find those that have a popularity level below a given threshold, and these records are cancelled from OLTP 44. The popularity may be measured for a given sliding window size (e.g., 14 or 15 days) or may be based on a weighted calculation of the popularity level which gives higher weight to newer data.

Alternatively or additionally to considering the popularity of records, the stability of the records may be considered in determining which records are to be removed from OLTP 44. Optionally, only records that did not change for at least a predetermined time window, or that were updated only a minimal number of times during a recent time window, are removed from OLTP 44.

In some embodiments, once a record is moved to long term storage area 49 it is not moved back to OLTP 44. In other embodiments, records in long term storage area 49 having a high update rate are moved back to OLTP 44 with a copy in short term area 48. Optionally, the transfer of records back to OLTP 44 is performed periodically, for example each time the transfer and delete operation is performed.

Alternatively to storing the records directly into OLTP 44, incoming records may be stored first in warehouse 46 and only those determined to be frequently updated are transferred to OLTP 44.

In some embodiments, the importance or quality of service (QoS) of the records is also taken into consideration in determining whether to duplicate a record. Optionally, high priority records are kept longer in OLTP 44. Alternatively, high priority records are kept in long term area 49, to avoid problems of data duplication.

System Structure

In some embodiments, OTLP 44 is divided into a plurality of partitions, e.g., at least 25 or even at least 50. The data is optionally distributed between the partitions using a round robin scheme or any other suitable scheme, such as a hash and/or modulo scheme. The distribution between the units is optionally performed in a manner such that consecutive records can be stored one after the other without interfering with each other. One or more indices to the records, for example including an index by time, index by identity of record and index by identity of stream, are managed in OLTP 44 in order to allow quick responding to queries. The number of indices managed is optionally selected as a compromise between the need to allow fast creation of new records, which advocates a small number of indices and fast responding to queries, which is better achieved having a larger number of indices. The specific number of indices used may be selected according to the ratio between the number of queries which could be more speedily handled if another index were available and the total number of queries created in a given period. In some embodiments, database 40 periodically determines the ratio between queries and created records and accordingly adjusts in real time the number of indices managed.

Optionally, OLTP 44 is implemented on a relation database (RDBMS). In some embodiments, OTLP 44 comprises, for example, an Adaptive Server Enterprise (ASE) database unit, such as that produced by Sybase Inc.

Warehouse 46 is optionally divided into sub-divisions. Optionally, the records in long term area 49 are distributed into sub-divisions according to the times of the records. Warehouse 46 optionally manages a plurality of indices to allow fast response to queries.

Database warehouse unit 46 optionally includes a column oriented database. In an exemplary embodiment, warehouse 46 is based on an IQ database of Sybase. Optionally, warehouse 46 is a large database configured to store at least 100 million records, at least 500 million records or even at least 1,000 million records. Warehouse 46 is optionally designed in a scalable manner, allowing increasing its capacity as needed according to system requirements. It is noted that the sub-divisions of warehouse 46 may all be located on a single physical memory unit or different sub-divisions may be mounted on different physical units. In embodiments in which warehouse 46 is hosted by a plurality of different physical memory units, the memory units may all be located in a single location, possibly in a single housing, or they may be divided between different rooms or even different buildings, with suitable cable connections.

In some embodiments, application server 42 is configured to identify duplicate data appearing in both OLTP 44 and long term area 49. Application server 42 optionally removes the duplicate data not only from the results forwarded as a response to the query, but also removes the duplicate record from OLTP 44. Alternatively or additionally, database 40 periodically performs a data cleanup process which reviews the data in OLTP 44 to determine old records that should not be in the OLTP 44. The data cleanup process optionally verifies that the records are in long term area 49 and deletes them from OLTP 44. The cleanup process is optionally activated during low usage periods of database 40.

Short term area 48 and long term area 49 are optionally managed as separate databases on a single database server. Short term area 48 and long term area 49 optionally have separate controls and different transaction longs. In some embodiments of the invention, short term area 48 and long term area 49 are hosted on separate disks, so that the short term and long term areas may be accessed concurrently without interfering with each other.

Database 40 is optionally optimized during installation. The XML files and the indexes used are optionally tuned to achieve a fastest average response time from database 40. Optionally, a first optimization is performed for OLTP 44 and then an optimization is performed for warehouse 46. The optimization may be repeated iteratively a predetermined number of times and/or until an optimal optimization is achieved or until the gain for an optimization stage is below a given threshold.

Example Application

In an example embodiment, database system 20 is used is storing monitored communication sessions collected by one or more traffic monitors, such as a telephony probe and/or an IP probe. The communication sessions are optionally stored in storage unit 30 while their metadata is managed by database 40. The metadata is stored in a database 40 and is updated during the monitoring of the sessions until they are terminated and possibly even afterwards. For example, the metadata may indicate the length of the session, an amount of data passing on the session, events during the session (e.g., transfer of DTMF signals), the start time of the session and/or the end time of the session. Optionally, the database is kept up to date with session information, preferably being updated at least to the latest five seconds or even the last second.

Conclusion

Although database 40 was described above as being used with a traffic monitoring system 20, database 40 may be used for other tasks in which a large amount of data needs to be managed and updated.

It will be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A database system, comprising:
an online transaction processing (OLTP) database;
a warehouse database comprising a short term storage area and a long term record storage area; and
an application server comprising a processor coupled to a memory, wherein the application server is configured to manage coordination between the OLTP database and the warehouse database by at least:
periodically duplicating and storing to the short term area of the warehouse database, using an ETL (Extract, Transform, Load) process, all data that has recently been added or changed in the OLTP database, wherein the duplicating and storing is performed at a rate selected in such a way so that during the duplicating and storing at least a predetermined percentage of database queries can be handled by the warehouse database without use of the OLTP database, and
after a predetermined amount of time from when the data is duplicated and stored to the warehouse database, moving the duplicated data from the short term area of the warehouse database to the long term area of the warehouse database and removing from the OLTP database the recently added or changed data;
wherein the application server is configured such that the OLTP database does not store data which is not also stored in the warehouse database, except for data recently added or changed in the OLTP database which has not yet been duplicated and stored to the warehouse database.

2. A method of managing a database, comprising:
providing an online transaction processing database (OLTP);
providing a warehouse database comprising a short term storage and a long term storage area;
providing an application server that is configured to manage coordination between the OLTP database and the warehouse database by at least:
periodically duplicating and storing to the short term area of the warehouse database, using an ETL (Extract, Transform, Load) process, all data that has been recently added or changed in OLTP database, wherein the duplicating and storing is performed at rate selected in such a way so that during the duplicating and storing, at least a predetermined percentage of database queries can be handled by the warehouse database without use of the OLTP database, and
after a predetermined amount of time from when the data is duplicated and stored, moving the duplicated data from the short term area of the warehouse database to the long term area of the warehouse database and removing the recently changed or added data from the OLTP database;

wherein the application server is configured such that the OLTP database does not store data which is not also stored in the warehouse database, except for data recently added or changed in the OLTP database which has not yet been duplicated and stored to the warehouse database.

3. The method of claim 2, comprising estimating whether received queries need real time information, and if so, forwarding the queries to the OLTP or to the short term area.

4. The method of claim 2, wherein the data stored in OLTP is removed only after the copied data has been successfully moved from the short term area of the warehouse database to the long term area of the warehouse database.

5. The system of claim 1, wherein the application server is further configured to estimate whether received queries need real time information, and if so, forwarding the queries to the OLTP or to the short term area.

6. The system of claim 1, wherein the data stored in OLTP is removed only after the copied data has been successfully moved from the short term area of the warehouse database to the long term area of the warehouse database.

* * * * *